United States Patent
Kim et al.

(10) Patent No.: US 6,944,635 B2
(45) Date of Patent: Sep. 13, 2005

(54) METHOD FOR FILE DELETION AND RECOVERY AGAINST SYSTEM FAILURES IN DATABASE MANAGEMENT SYSTEM

(75) Inventors: Hong-Yeon Kim, Daejeon (KR); Jongho Won, Incheon (KR); June Kim, Daejeon (KR); Myung-Joon Kim, Daejeon (KR)

(73) Assignee: Electronics and Telecommunications Research Insitute, Daejon (KR)

( * ) Notice: Subject to any disclaimer, the term of this patent is extended or adjusted under 35 U.S.C. 154(b) by 383 days.

(21) Appl. No.: 10/175,098

(22) Filed: Jun. 20, 2002

(65) Prior Publication Data

US 2003/0126163 A1 Jul. 3, 2003

(30) Foreign Application Priority Data

Dec. 28, 2001 (KR) ........................ 2001-86768

(51) Int. Cl.[7] .................. G06F 17/00; G06F 11/00; G06K 5/04
(52) U.S. Cl. .................. 707/202; 707/200; 707/204; 707/1; 714/100; 714/1; 714/2; 714/699
(58) Field of Search .......................... 707/1–2, 7–10, 707/200–202; 714/1–2, 100, 19, 15

(56) References Cited

U.S. PATENT DOCUMENTS 5,465,328 A * 11/1995 Dievendorff et al. ......... 714/15
5,481,699 A * 1/1996 Saether ........................ 714/15
5,712,971 A * 1/1998 Stanfill et al. ................ 714/34

FOREIGN PATENT DOCUMENTS

KR 1996-24068 7/1996 ........... G06F/17/30

OTHER PUBLICATIONS

C. Mohan, et al; ARIES *A Transaction Recovery Method Supporting Fine–Granularity Locking and Partial Rollbacks Using Write–Ahead Logging*; ACM Transactions on Database System, vol. 17, No. 1; Mar. 1992; pp. 94–162.

* cited by examiner

*Primary Examiner*—Alford W. Kindred
(74) *Attorney, Agent, or Firm*—Mayer, Brown, Rowe & Maw LLP

(57) ABSTRACT

A method for file deletion and recovery against system failures in a database management system comprising steps of deleting files listed in a pending action list during a transaction commit process, writing a non-atomic file deletion as an atomic operation into a log and recovering uncompleted file deletion during restart recovery by using the log is disclosed. When system failures occur during file deletion in a database management system, resources of which releasing is interrupted by failures are released perfectly through recovery step, so it is advantageous in that coherency of data is maintained and efficiency of storage device arises.

6 Claims, 9 Drawing Sheets

METHOD FOR FILE DELETION AND RECOVERY AGAINST SYSTEM FAILURES IN DATABASE MANAGEMENT SYSTEM

FIELD OF THE INVENTION

The present invention relates to a method for file deletion and recovery method against system failures in a database management system; and, more particularly, to a method for recovering from system failures such as a stoppage of electric current and media failures including a disk fault in a transaction process system of a multi-user environment.

BACKGROUND OF THE INVENTION

A transaction system of the prior art performs recovery based on WAL(Write Ahead Logging) for recovery against system failures and media failures. This technique is important to support transaction atomicity, which means that a transaction request should be carried out in an atomic operation but not through several operations in the transaction system. That is, when the transaction is to be aborted due to system failures, what is done according to the transaction should be undone to maintain the transaction atomicity.

In order to raise recovery efficiencies, these transaction systems carry out requests such as a request for file deletion in a particular way. This is because, when a transaction including file deletion operation is to be aborted, what has been changed due to the file deletion should be undone. Further, this process costs much.

In a recovery technique described in ARIES(Algorithm for Recovery and Isolation Exploiting Semantics), a file deleting request is deferred until transaction commitment is completed. In order to support the above-described operation, almost transaction system keeps a pending action list in a transaction table. And then, if a file delete request is generated before the transaction commitment is completed, the transaction system does not perform file deletion but just registers the file delete request in the pending action list. After the transaction is committed, a transaction manager processes the file delete request with reference to the pending action list.

But in ARIES, there is suggested no method against system failures during the processing file delete requests after a transaction is committed. If system failures occur while file deletion is being carried out, a part of storage space remains not being released, which results in that a part of the storage space is unable to be used later or coherency of the storage space is not maintained.

A solution to the above-described problems is suggested in the prior art.

Referring to the prior art, the file deletion is completed to release the part of storage space that remains not being released when system failures occur during the file deletion. This is enabled by deleting the corresponding file again even if the file deletion is interrupted by the system failures.

The method of the prior art is advantageous in that the recovery process related to file releasing against system failures can be simplified.

Meanwhile, to satisfy such property of the prior art in deleting a file having multiple allocation blocks in several storage devices, system should keep consistency when the file releasing is interrupted. Accordingly, in order to release the block allocated for the file, all of the correlated changes between the blocks on storage should be considered or not, such that the system consistency is maintained.

That is, if one of these processes is interrupted by system failures, discordance is generated between data structures of the allocation blocks, and the consistency of data is corrupted. Such a problem arises because a file deletion process is a non-atomic operation including multiple consecutive processes.

SUMMARY OF THE INVENTION

It is, therefore, an object of the present invention to provide a method for deleting files safely and recording the operation of deleting files against system failures, which is generated during the file deleting.

Another object of the present invention is to provide a method for recovery against such system failures by correcting an error of uncompleted file releasing. The file releasing comprises of repeated non-atomic operations. In accordance with a preferred embodiment of the present invention, there is provided a method for file deletion and recovery against system failures in a database management system, the method comprising the steps of: (a) deleting files listed in a pending action list during a transaction commit process and writing a non-atomic operation including file deletion into a log as an atomic operation; and (b) recovering uncompleted file deletion during restart recovery by using the log.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

The preferred embodiments of the present invention will now be described in detail with reference to the accompanying drawings.

Figure 1:
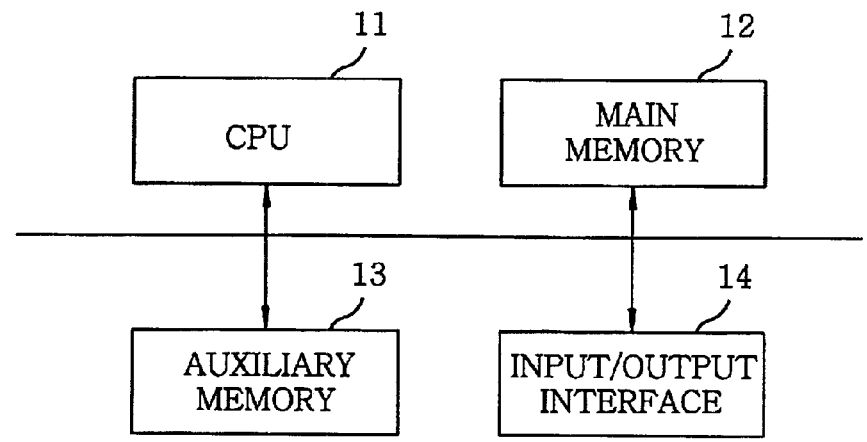
FIG. 1 illustrates a structure of a database management system in accordance with the present invention.

FIG. 1 illustrates a structure of database management system applied by a method for file deletion and recovery against system failures in accordance with the present invention.

A device for the present invention includes CPU 11 for control and management of the entire operation, main memory 12 and auxiliary memory 13 for saving the program operated in CPU 11, and for storing data that is used and generated during the operation, and input/output interface 14 for data communication with user.

Figure 2:
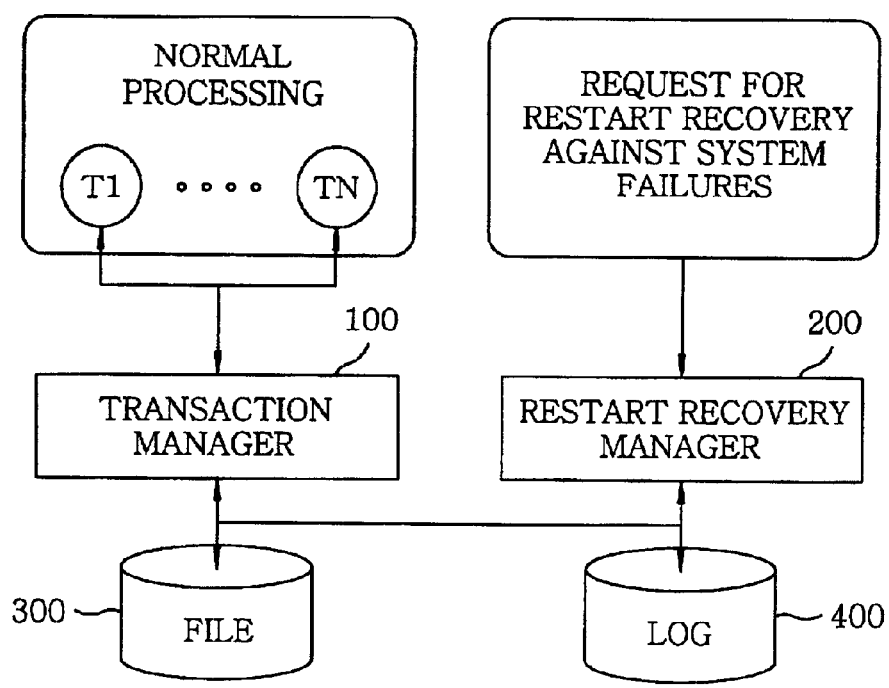
FIG. 2 exhibits a structure of a module for carrying out file deletion and recovery against system failures in accordance with the present invention.

FIG. 2 exhibits a structure of a module for carrying out file deletion and recovery against system failures in accordance with the present invention.

The module has a transaction manager 100, a restart recovery manager 200, a file 300, and a log 400.

The transaction manager 100 carries out a plurality of transaction process requests in normal system processing. A transaction process request begins with a transaction initiate request(BOT). The transaction process repeats a file create request(CREAT), a file delete request(DESTROY), a file read request(READ), and a file write request(WRITE), and then carries out a transaction commit request(COMMIT). The transaction manager 100 processes the request and writes the result of the processing into the file 300. At the same time, a trace of the processing is written in the log 400, thereby an atomicity of a transaction processing having a group of process requests is guaranteed.

The restart recovery manager 200 is activated by system failures and carries out recovering system consistency. The restart recovery manager 200 redoes information into the file 300, herein the information did not get reflected among the result of transaction which had been done before system failures. And the result of interrupted transaction by system failures is undone from the file 300.

Figure 3:
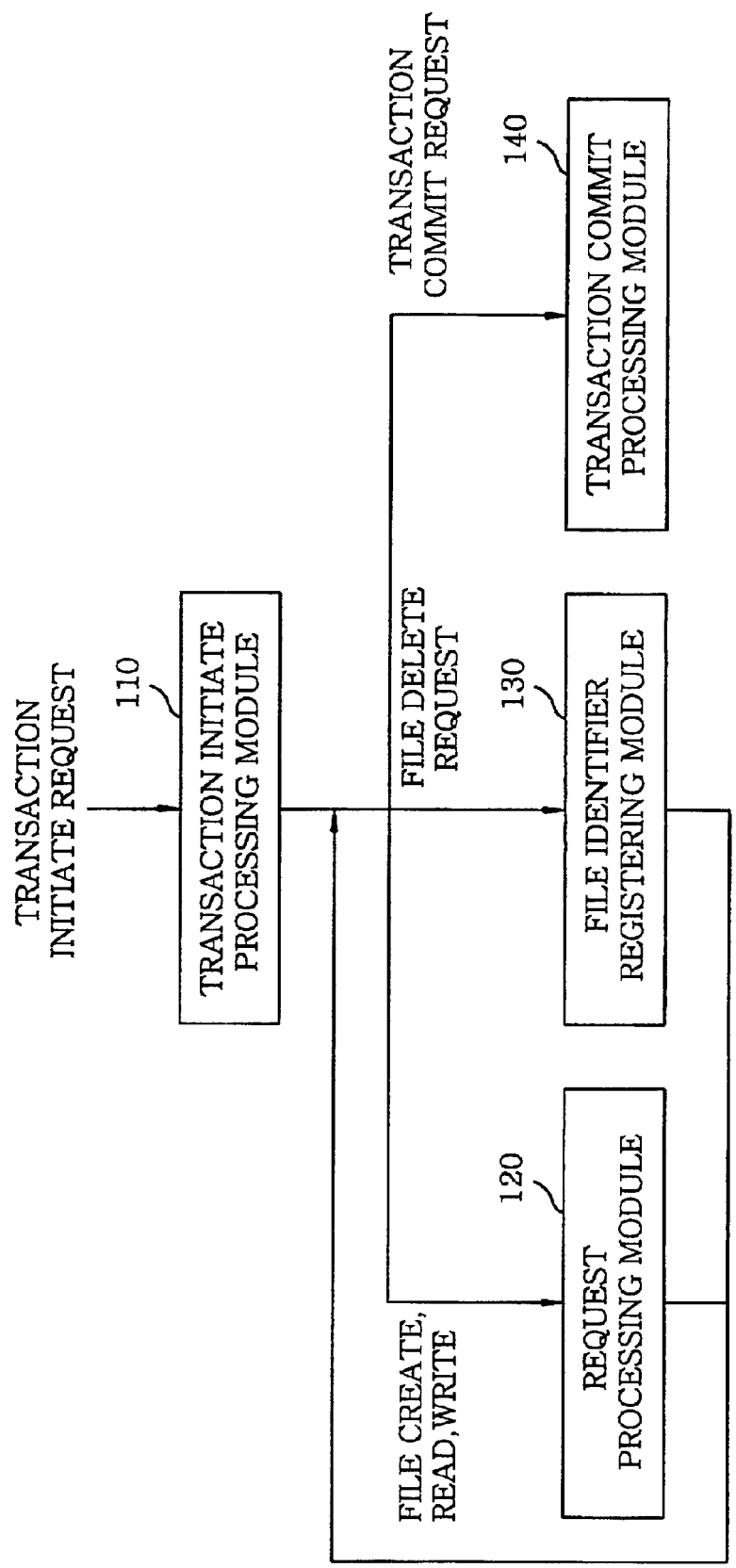
FIG. 3 shows a detailed structure of a transaction manager for carrying out file deletion and recovery against system failures in accordance with the present invention.

FIG. 3 shows a structure of a transaction manager in detail for performing file deletion and recovery against system failures in accordance with the present invention.

If a transaction initiate request(BOT) is generated, a transaction initiate processing module 110 provides a transaction identifier(TID) for each transaction and registers the TID on a transaction table with other relevant information.

If a transaction is activated, entire process request except a file delete request are performed by a request processing module 120 before a transaction commit request (COMMIT). These requests include a file create request, a file read request, and a file write request. The requests, which cause the change of file 300 information, are written in a log 400 before being operated to prepare the recovery against system failures.

Meanwhile, the file delete request isn't processed actually until commitment of the transaction is confirmed. Entire file delete request generated before confirm of transaction commitment, are listed in a pending action list by a file identifier registering module 130. Actual deleting action is executed when the transaction commit request is performed.

The transaction commit request is performed by a transaction commit processing module 140. This module writes a non-atomic operation including a file deletion as an atomic operation, which is the object of the present invention.

Figure 4:
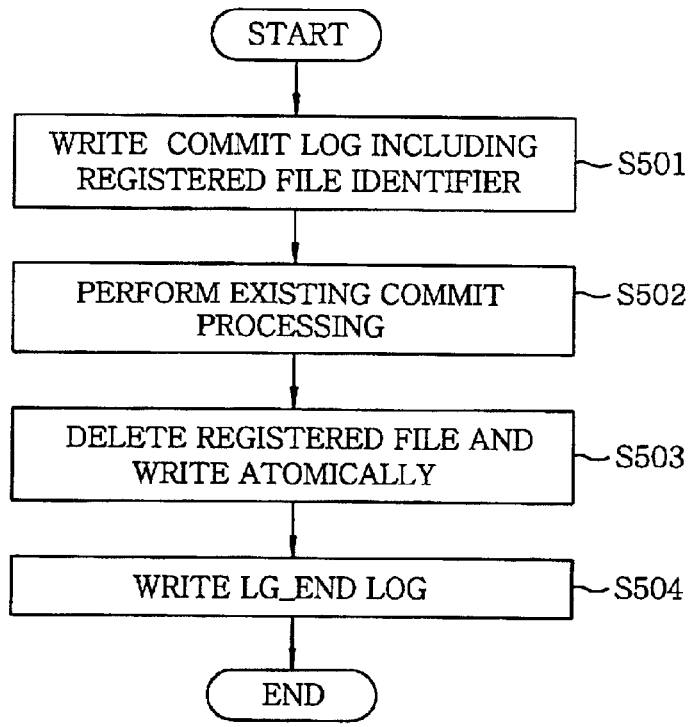
FIG. 4 depicts a flowchart showing the operation of transaction commit processing module in accordance with the present invention.

FIG. 4 depicts a flowchart showing the operation of a transaction commit processing module 140.

The transaction commit processing module 140 writes a commit log record into the log 400 to confirm the commitment of transaction(S501). The commit log record includes a deleting file identifier that is listed in the pending action list.

After the commit log record is written in the log, a conventional commit processing, such as a releasing of a lock acquired by the transaction or a releasing of the transaction table, is performed(S502).

Afterward, deleting files listed in the pending action list and writing such operations as an atomic operation into the log are processed(S503). This process should be performed after writing of the commit log record, for the successful recovery against system failures by the recovery manager module. That is, entire log record having relation with the file deletion should be written in the log 400 after writing the commit log record. The present invention provides three methods for writing a non-atomic operation including file deletions as an atomic operation.

Finally, an LG_END log representing the termination of the commit request is written(S504).

Figure 5:
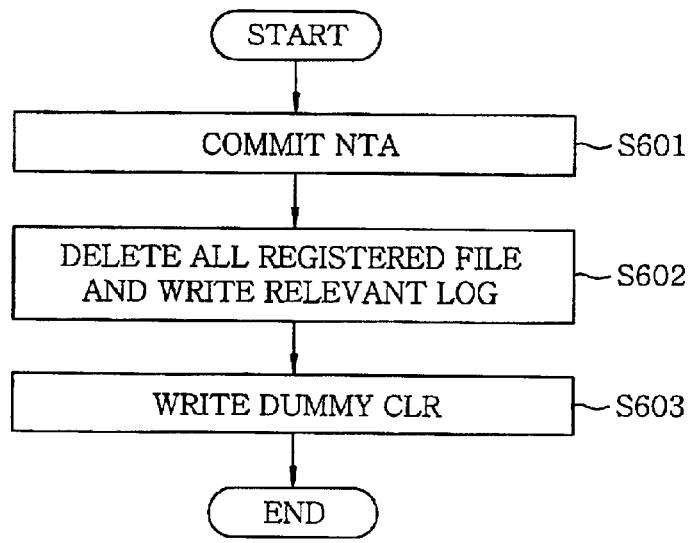
FIG. 5 describes a flowchart showing a procedure of writing a non-atomic operation including multiple file deletion as an atomic operation in accordance with the present invention.
Figure 6:
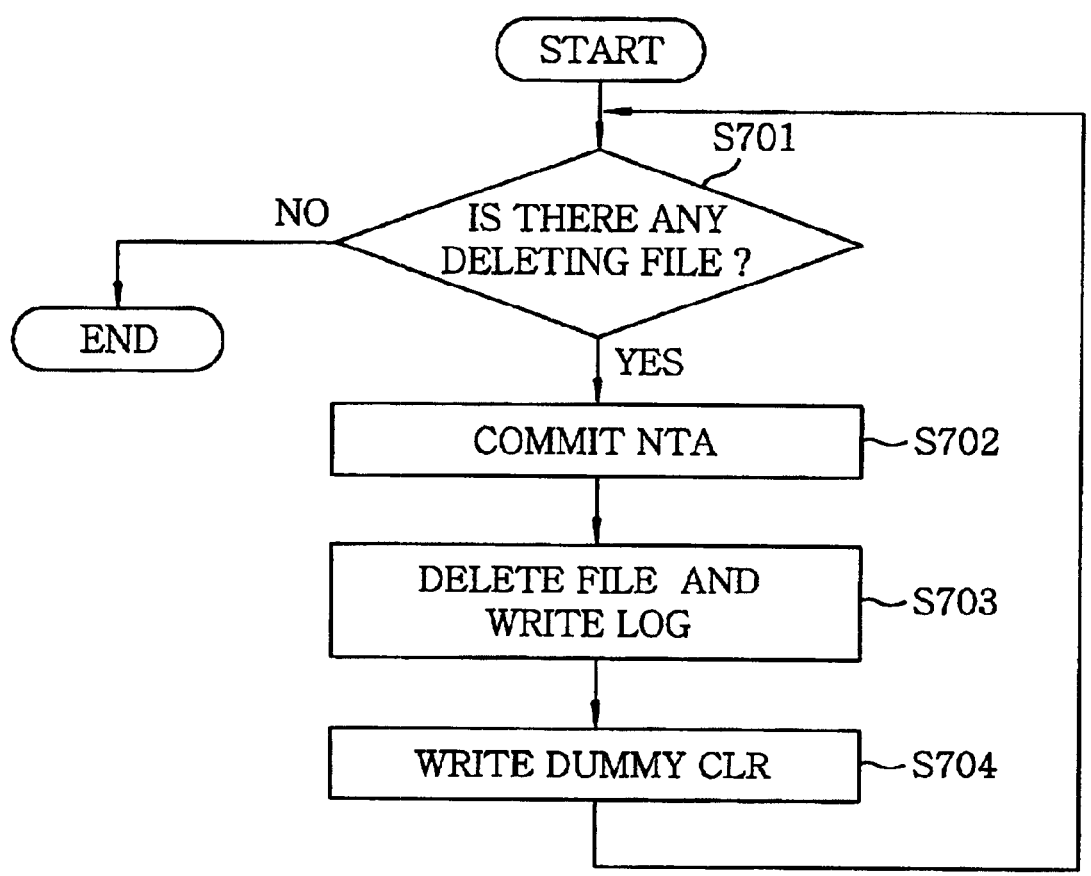
FIG. 6 illustrates a flowchart showing a procedure of writing a non-atomic operation including single file deletion as an atomic in accordance with the present invention.
Figure 7:
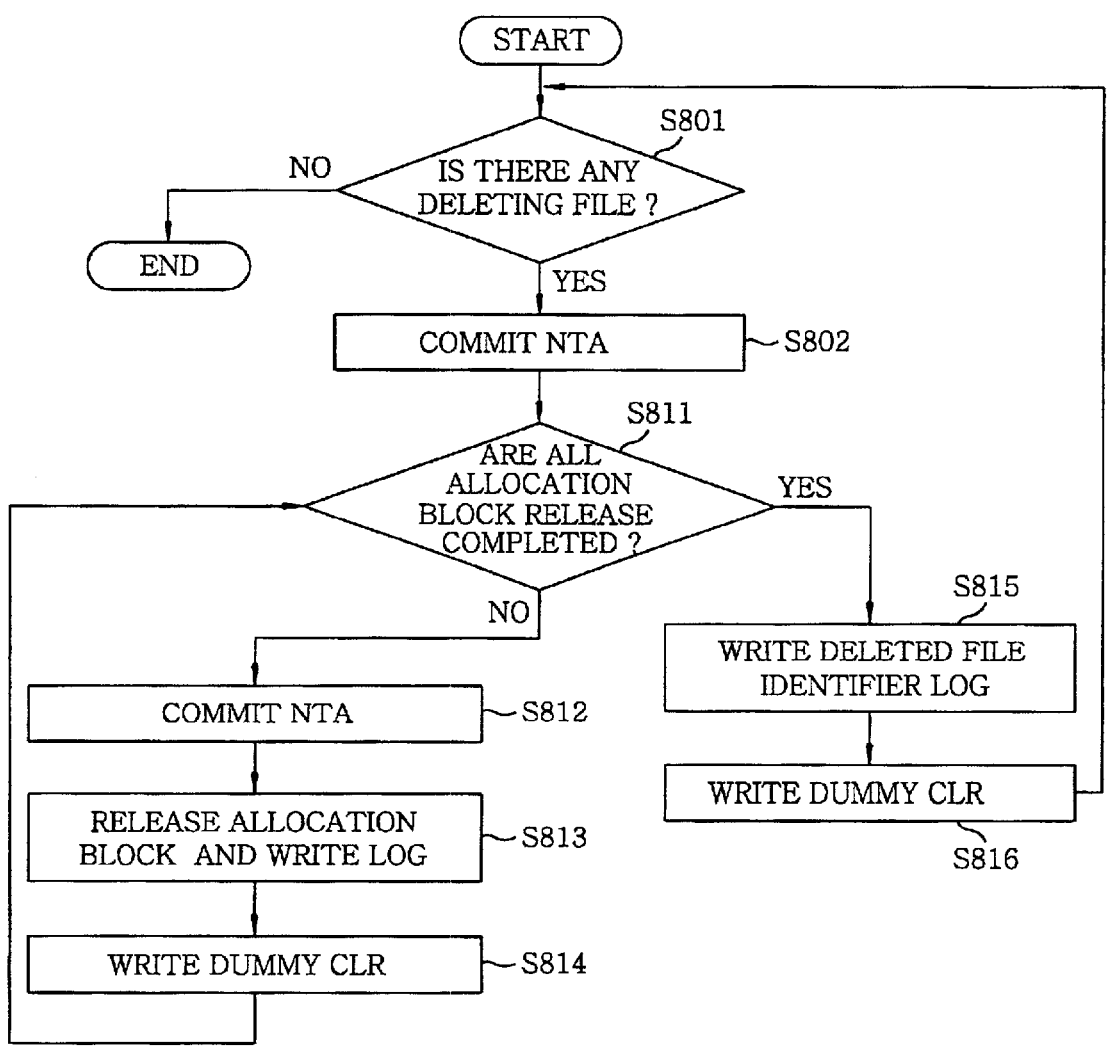
FIG. 7 offers a flowchart showing a procedure of writing non-atomic operation of releasing allocation block as an atomic operation in accordance with the present invention.

FIGS. 5 to 7 represent flowcharts showing a procedure of writing a non-atomic operation including file deletions as an atomic operation in accordance with the present invention. Because each method are different with each others in complexity of realization and speed of recovery, there is need to choose the method according to the respective actual operation applied.

FIG. 5 describes a flowchart showing a procedure of writing a non-atomic operation including multiple files deletions as an atomic operation in accordance with the present invention.

First, an address of current last log record is stored in a main memory by commitment of the NTA(S601).

Then, a deleting files listed in a pending action list is deleted together with the log record by a conventional file deleting method(S602). Wherein the file deleting method needs not to be realized in an atomic operation.

Finally, by using the address of log record written when the NTA was committed, a DummyCLR log record is formed and written into the log(S603).

This method(S601~S603) in which a non-atomic operation including multiple files deletions is written as an atomic operation, achieves the object of the present invention by using single DummyCLR log record. Hence, increasing of log quantity and realizing complexity can be limited to minimum level. But, if system failures occur between the NTA and writing of the DummyCLR log record, entire file releasing which has been done by that time, should be undone and the releasing should be restarted from beginning. So the cost of restart recovery is much.

FIG. 6 illustrates a flowchart showing a procedure of writing a non-atomic operation including a single file deletion as an atomic operation in accordance with the present invention.

It is determined if there are deleting files in a pending action list(S701). If there are deleting files in the pending action list, allocating a single identifier and writing the single file deletion as an atomic operation are repeated (S702~S704).

First, an address of current last log record is written in main memory by commitment of the NTA(S702).

Thereafter, entire deleting files are deleted with the log record by the conventional method(S703). At this time, the file deletion method need not to be implemented by atomic operation.

Finally, by using the address of log record written when the NTA was committed, a DummyCLR log record is formed and written in the log(S704).

These operations are iterated until no more deleting file exists in the pending action list.

In this method, generating log quantity increases and implementing complexity arises in comparison with the above-described method in which non-atomic operation including multiple file deletion is written as an atomic operation. However, because only a file deletion which has been interrupted by system failures is undone and the file deletion operation can keep going from such interrupted files to another, it is advantageous to reduce recovery time.

FIG. 7 offers a flowchart showing a procedure of writing a non-atomic operation of releasing allocation block as an atomic operation in accordance with the present invention.

It is examined whether deleting files exist in a pending action list(S801), and if a deleting file exists, a non-atomic operation including file deletion for each allocation block is written as an atomic operation(S802~S816).

First, if there are deleting files in the pending action list, the deleting files have been allocated from the pending action list. And then, an address of current last log record is written in main memory by commitment of the NTA(S802).

Now that, writing of allocation block releasing as an atomic operation with respect to the allocation block (S811~S814) is repeated until there is no more allocation block to be released among the files which is being deleted.

If there is an allocation block to be released, the allocation block to be released is chosen. And then, an address of current last log record is written in main memory by commitment of the NTA(S812).

Thereafter, the current allocation block to be released is released(S813). Here, there is no need for allocation block releasing to be implemented as an atomic operation.

Then, by using the address of log record written by the latest commitment of the NTA, a DummyCLR log record is formed and written in the log(S814).

If entire allocation block in files have been released, a file deletion log(LG_DESTROY) including a file identifier, is written in the log and the file identifier is released to the system(S811,S815).

As a last step, a DummyCLR is written and the step S801 continues to delete the next files(S816).

This method has more log quantity to be written and higher degree of implementing complexity than the other method in which the non-atomic operation including single or multiple file deletion is written as an atomic operation. But, it is most efficient in recovery because only the allocation block, which is interrupted during restart recovery against system failures is undone and only the allocation block after interruption is to be redone.

Figure 8:
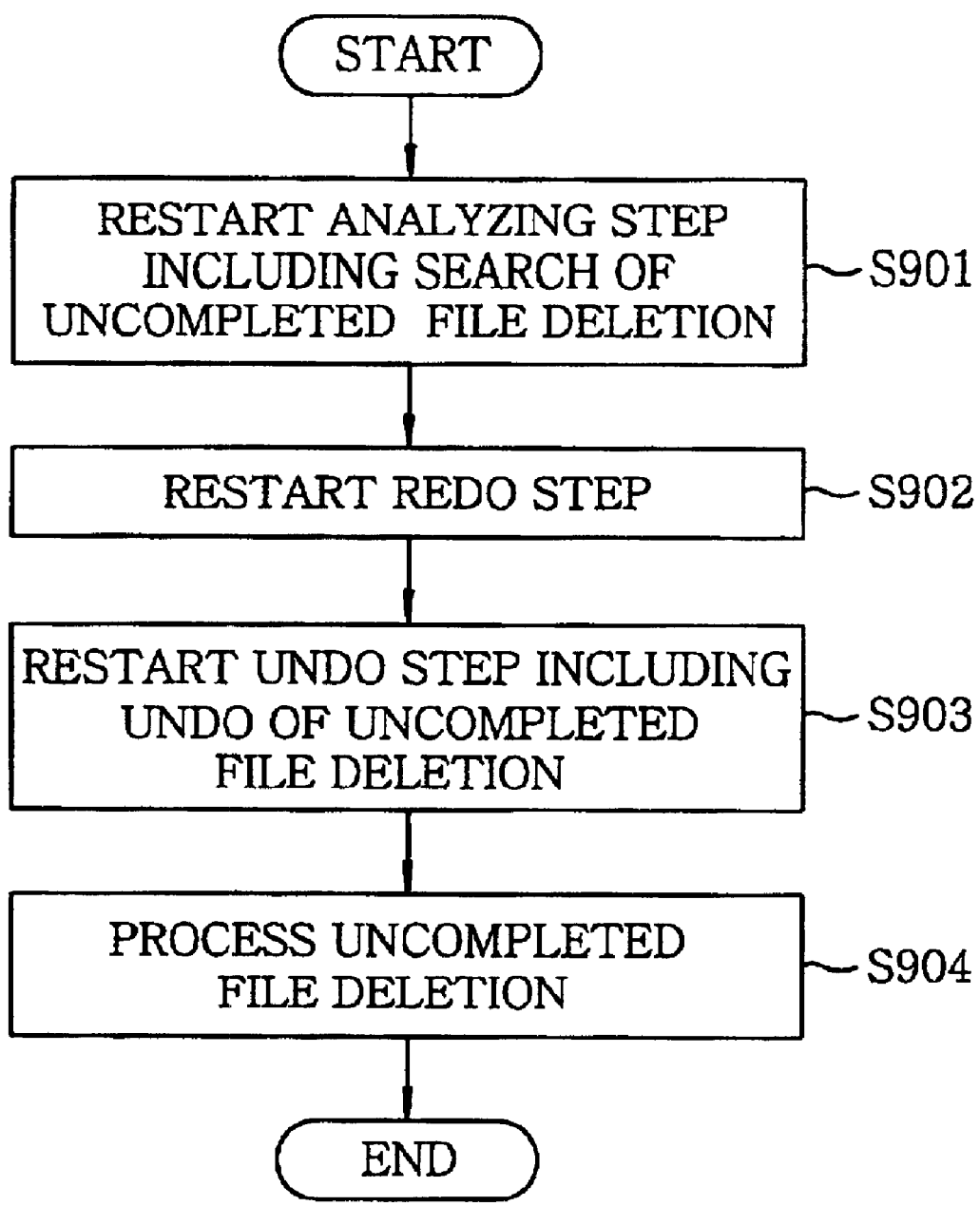
FIG. 8 presents a flowchart showing an operation of a restart recovery manager in accordance with the present invention.

FIG. 8 presents a flowchart showing a procedure of a restart recovery manager in accordance with the present invention.

The restart recovery manager carries out a restart analysis step including search of an uncompleted file deletion (S901), a restart redo step(S902), a restart undo step including undo of the uncompleted file deletion(S903), and a processing of the uncompleted file deletion step(S904) along this sequence.

Figure 9:
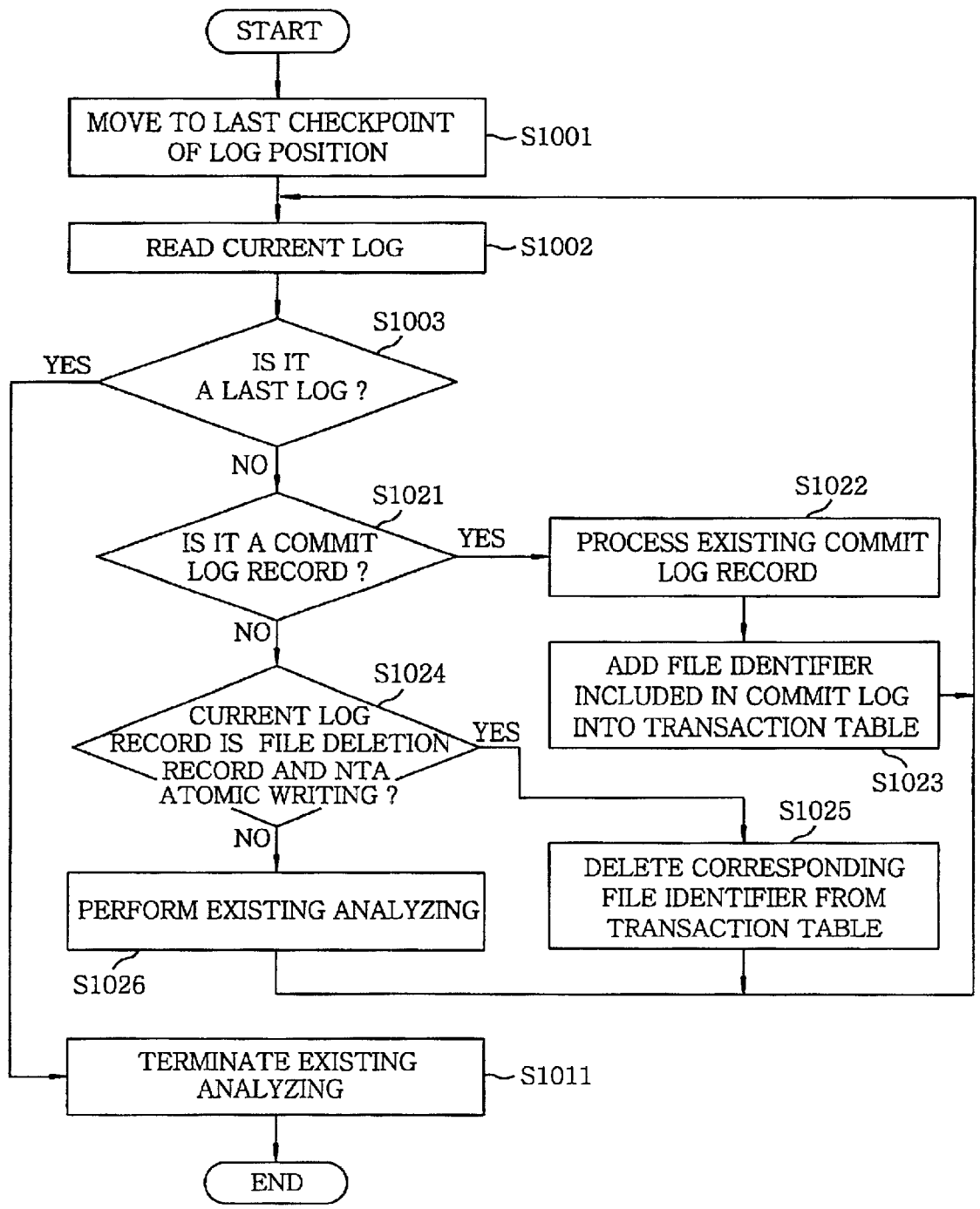
FIG. 9 represents a flowchart showing in detail a restart analysis step being executed by the restart recovery manager in accordance with the present invention.

FIG. 9 represents a flowchart showing in detail a restart analysis step by the restart recovery manager in accordance with the present invention.

To begin the restart analysis step, a log reading location is ascertained by a checkpoint of log record which has successfully performed rightly before the analysis step(S1001).

Then, a log is read at the current location(S1002). If the log record of current location is not a last log record, the current log record is analyzed(S1003).

Thereafter, it is examined whether the current log record is a commit log record(S1021). If a commit log record has been read, the file identifiers listed in the pending action list of the current log record, is added to a transaction table (S1023) in addition to the processing of the commit log record(S1022). And then, analysis for a next log record is continued(S1002).

If the current log record is a file delete log record and the file deletion is not performed by the method in which the operation including multiple files deletions is written as an atomic operation(FIG. 5), the file identifier stored in the log record is deleted from the pending action list of corresponding transaction entry in the transaction table. This prevents the deleted file from being deleted again. Because a completed file deletion is not undone during the restart undo step by other than the method in which the operation including multiple files deletions is written as an atomic operation. After entire processing for the delete log record has been completed, analysis for a next log record is proceeded (S1002).

If the current log record is not a file delete log record, the same procedure with former restart analysis is executed (S1026).

Figure 10:
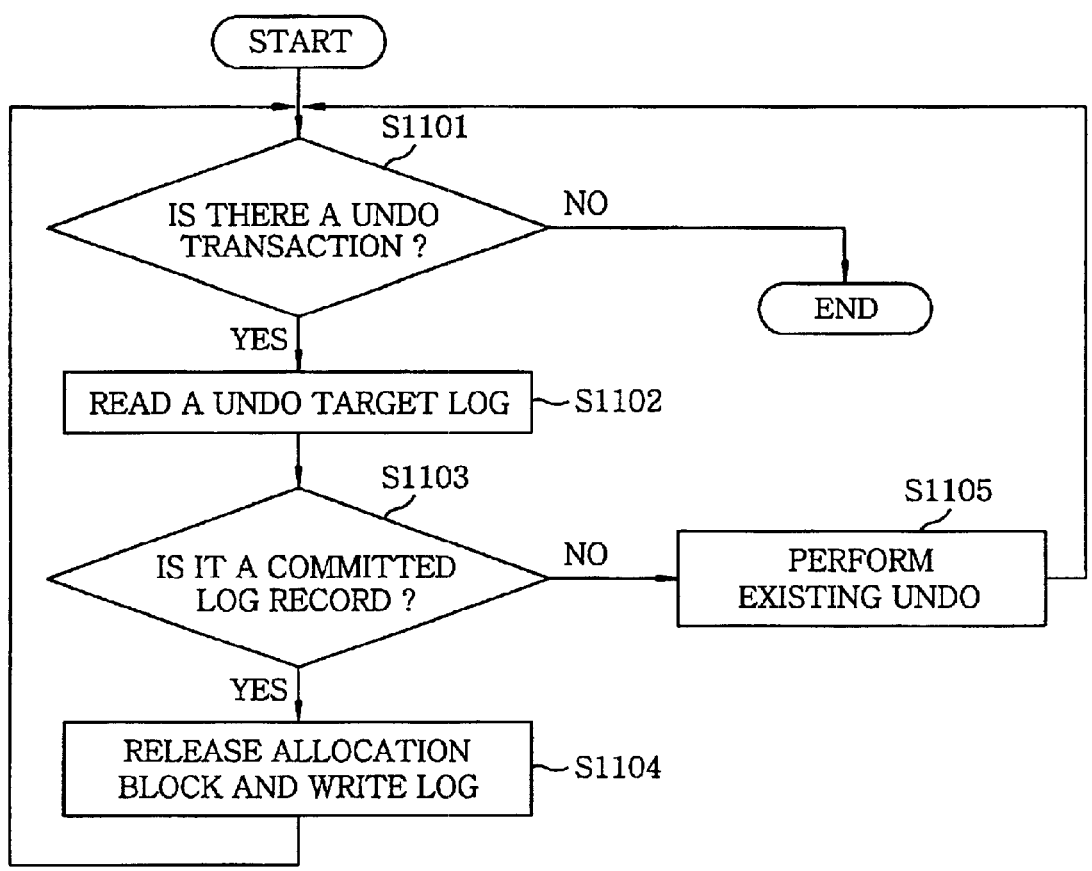
FIG. 10 describes a flowchart showing in detail a restart undo step being executed by the restart recovery manager in accordance with the present invention.

FIG. 10 describes a flowchart showing in detail a restart undo step by the restart recovery manager in accordance with the present invention.

First, it is examined whether there is a undo transaction in a transaction table constructed in the restart analysis step (S1101).

If there is a undo transaction, a undo log record which has the maximum address among the undo log record is chosen, and the undo log is read(S1102).

Thereafter, it is examined if the type of log is a commit log record(S1103). If the log record is a commit log record, this means that an undo action for corresponding transaction is completed in the transaction table(S1104). In this case, the respective transaction information should not be destroyed. After this action has been completed, an undo action for a next log record is performed(S1101).

If the log record is not a commit log record, the undo operation thereafter is same with existing procedure(S1105). After the undo operation has been completed, the undo operation for a next log record is performed(S1101).

Figure 11:
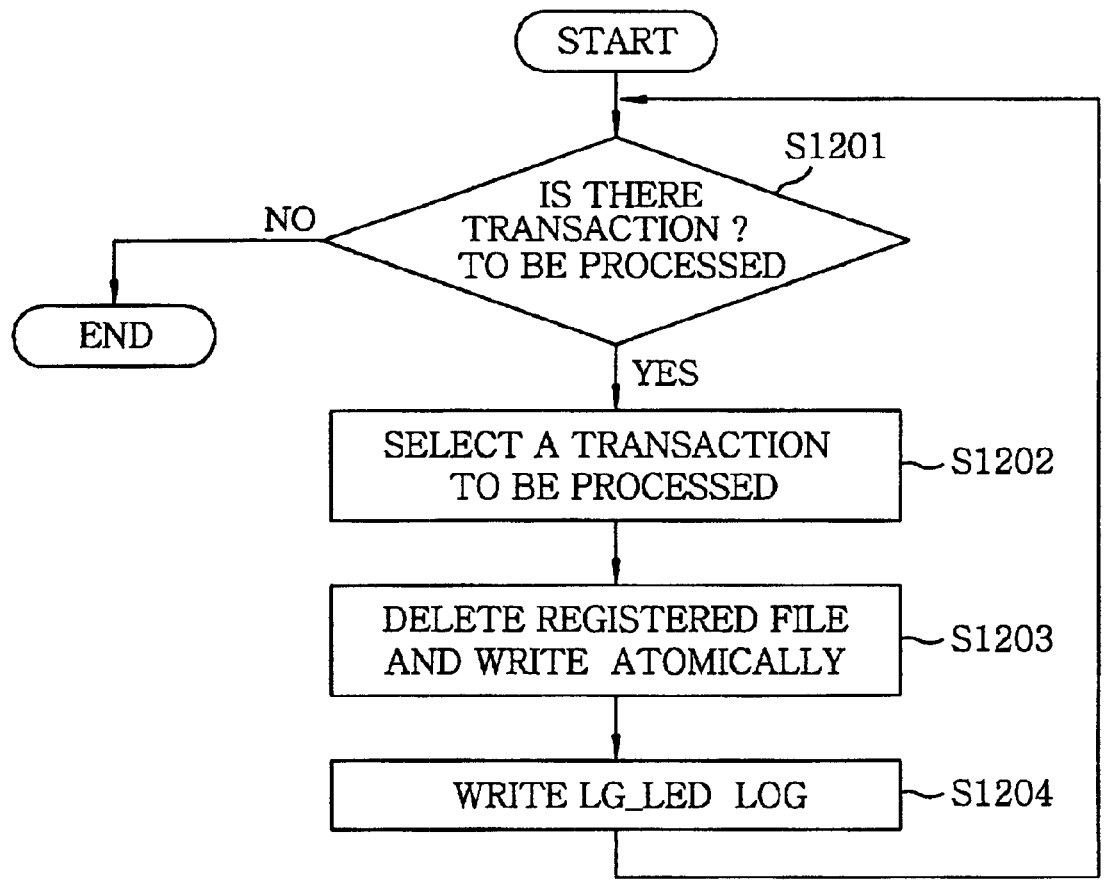
FIG. 11 shows a flowchart showing in detail a step of processing uncompleted file deletion by the restart recovery manager in accordance with the present invention.

FIG. 11 shows a flowchart showing in detail a step of processing an uncompleted file deletion by the restart recovery manager in accordance with the present invention.

First, it is examined whether there is a target transaction for the uncompleted file deletion in a transaction table, in accordance with the present invention(S1201). If there is a target transaction, the transaction should be allocated from the transaction table(S1202), and then the corresponding files are deleted by one of the file deleting method in which file deleting operation is written as an atomic operation (S1203). And an LG_END log record is constructed and written in the log(S1204) thereafter.

This process is repeated until there is no more target transaction in the transaction table.

While the invention has been shown and described with respect to preferred embodiments, it will be understood by those skilled in the art that various changes and modifications may be made without departing from the spirit and scope of the invention as defined in the following claims.

What is claimed is:

1. A method for file deletion and recovery against system failures in a database management system, the method comprising the steps of:
   (a) deleting files listed in a pending action list during a transaction commit process and writing a non-atomic operation including file deletion into a log as an atomic operation; and
   (b) recovering uncompleted file deletion during restart recovery by using the log, wherein the step (b) comprises the steps of:
      (b1) processing restart analysis including search of the uncompleted file deletion;
      (b2) processing restart undo including undo of the uncompleted file deletion; and
      (b3) performing the uncompleted file deletion, wherein the step (b1) comprises the steps of:
         (b11) if analysis is performed by reading a commit log record from a last checkpoint location, adding a file identifier list included in the log record into a transaction table as a corresponding transaction item; and
         (b12) if analysis is performed by reading a file delete log record from the last check point location, deleting a file identifier stored in the log record from a corresponding transaction item of the transaction table.

2. The method of claim 1, wherein the step (b2) characterized in that, if an undo operation is performed by reading a commit log record from an undo target transaction in a transaction table, completion of the undo operation for the corresponding transaction is registered in the transaction table and the undo operation for the corresponding transaction is stopped.

3. The method of claim 1, wherein the step (b3) characterized in that the uncompleted file deletion is performed for each transaction in a transaction table and an LG—END log is written.

4. The method of claim 1, wherein the file deletion of the step (a) or the step (b3) comprises the steps of:
   (a1) deleting files and writing a DummyCLR after commitment of a NTA; and
   (a2) repeating a single file deletion and a DummyCLR writing for each file after commitment of the NTA.

5. The method of claim 4, the step (a2) characterized in that releasing an allocation block included in the file and writing a DummyCLR for each allocation block after commitment of the NTA is repeated in the single file deletion.

6. The method of claim 3, wherein the file deletion of the step (a) or the step (b3) comprises the steps of:
   (a1) deleting files and writing a DummyCLR after commitment of a NTA; and
   (a2) repeating a single file deletion and a DummyCLR writing for each file after commitment of the NTA.

* * * * *